(12) United States Patent
Li et al.

(10) Patent No.: US 11,067,507 B2
(45) Date of Patent: Jul. 20, 2021

(54) SENSORS WITH GRADIENT NANOSTRUCTURES AND ASSOCIATED METHOD OF USE

(71) Applicant: VERSITECH LIMITED, Hong Kong (CN)

(72) Inventors: Wendi Li, Hong Kong (CN); Zhouyang Zhu, Guangdong (CN); Shijie Li, Hong Kong (CN)

(73) Assignee: VERSITECH LIMITED, Hong Kong (CN)

( * ) Notice: Subject to any disclaimer, the term of this patent is extended or adjusted under 35 U.S.C. 154(b) by 0 days.

(21) Appl. No.: 16/618,536

(22) PCT Filed: Jun. 1, 2018

(86) PCT No.: PCT/CN2018/089512
§ 371 (c)(1),
(2) Date: Dec. 2, 2019

(87) PCT Pub. No.: WO2018/219344
PCT Pub. Date: Dec. 6, 2018

(65) Prior Publication Data
US 2020/0182790 A1 Jun. 11, 2020

Related U.S. Application Data

(60) Provisional application No. 62/513,631, filed on Jun. 1, 2017.

(51) Int. Cl.
*G01N 21/552* (2014.01)
*B82Y 15/00* (2011.01)

(52) U.S. Cl.
CPC ............ *G01N 21/554* (2013.01); *B82Y 15/00* (2013.01)

(58) Field of Classification Search
CPC .... G01N 21/554; G01N 21/658; G02B 5/008; G02B 6/1226
See application file for complete search history.

(56) References Cited

U.S. PATENT DOCUMENTS 6,236,033 B1 * 5/2001 Ebbesen ................ G01Q 60/22
250/216
9,310,306 B2 * 4/2016 Li ........................ G01N 21/658
(Continued)

FOREIGN PATENT DOCUMENTS

WO WO-2011091793 A1 * 8/2011 ............ G01J 3/0205
WO WO-2013039454 A1 * 3/2013 ........... B42D 25/305

OTHER PUBLICATIONS

International Search Report and Written Opinion in corresponding PCT Application No. PCT/CN2018/089512, dated Aug. 22, 2018.
(Continued)

*Primary Examiner* — Shawn Decenzo
(74) *Attorney, Agent, or Firm* — Leason Ellis LLP

(57) ABSTRACT

A plasmonic sensor with gradient nanostructures and a method of use thereof is provided. The gradient of shapes will induce different spectral responses at different region of the sensor and show different colors. When there is a change in the environment properties of a substance, such as refractive index, gas concentration or ion density changes, the sensor displays different images, e.g., redial intensity displays and radial color displays. An image recognition based method can be used to extract the environment property with high accuracy according to the sensor image.

23 Claims, 7 Drawing Sheets

(56) References Cited

U.S. PATENT DOCUMENTS

| | | | |
|---|---|---|---|
| 9,389,186 B2 | 7/2016 | Gibson et al. | |
| 9,612,201 B2* | 4/2017 | Ito | G01N 21/03 |
| 9,778,183 B2* | 10/2017 | Lin | G01N 21/554 |
| 9,993,185 B2* | 6/2018 | Walavalkar | G01N 21/658 |
| 2008/0280374 A1* | 11/2008 | Potyrailo | G01N 21/554 |
| | | | 436/172 |
| 2011/0114859 A1* | 5/2011 | Amako | G01N 21/774 |
| | | | 250/576 |
| 2011/0149214 A1* | 6/2011 | Yoon | G02F 1/133514 |
| | | | 349/106 |
| 2011/0205530 A1 | 8/2011 | Armitage | |
| 2011/0265305 A1* | 11/2011 | Di Fabrizio | B82Y 20/00 |
| | | | 29/428 |
| 2012/0038926 A1* | 2/2012 | Endo | G02B 1/005 |
| | | | 356/445 |
| 2012/0062881 A1* | 3/2012 | Sakagami | G01N 21/658 |
| | | | 356/301 |
| 2012/0105840 A1* | 5/2012 | Stuke | G01N 21/65 |
| | | | 356/301 |
| 2012/0140305 A1* | 6/2012 | Yashiro | G02F 1/133553 |
| | | | 359/230 |
| 2012/0182550 A1* | 7/2012 | Tang | G01N 21/658 |
| | | | 356/301 |
| 2014/0347661 A1* | 11/2014 | Kim | G01N 21/554 |
| | | | 356/301 |
| 2015/0065390 A1* | 3/2015 | Bratkovski | G01N 21/658 |
| | | | 506/12 |
| 2015/0139856 A1* | 5/2015 | Yamada | G01N 21/648 |
| | | | 422/69 |
| 2015/0160382 A1* | 6/2015 | Yamada | G02B 5/008 |
| | | | 359/599 |
| 2015/0212001 A1* | 7/2015 | Ito | G01N 21/658 |
| | | | 356/244 |
| 2015/0219561 A1* | 8/2015 | Ito | G01N 21/658 |
| | | | 356/301 |
| 2016/0003748 A1 | 1/2016 | Gibson et al. | |
| 2016/0003817 A1* | 1/2016 | Chou | G01N 21/6486 |
| | | | 435/6.11 |
| 2016/0170098 A1* | 6/2016 | Ivanovich | G02B 1/005 |
| | | | 359/241 |
| 2017/0176650 A1* | 6/2017 | Govorov | G02B 5/22 |
| 2018/0178571 A1* | 6/2018 | Zhu | B41M 5/46 |

OTHER PUBLICATIONS

Wei Hong, et al., "Wettability gradient colorimetric sensing by amphiphilic molecular response," Chemical Communications, 2013, 49(7), pp. 728-730.

King.Nicholas S., et al. "Fano resonant aluminum nanoclusters for plasmonic colorimetric sensing," ACS nano, 2015, vol. 9, No. 11 pp. 10628-10636.

Ding, Haibo.et al. "Free-Standing Photonic Crystal Films with Gradient Structural Colors," ACS applied materials & interfaces, 2016, 8, pp. 6796-6801.

* cited by examiner

SENSORS WITH GRADIENT NANOSTRUCTURES AND ASSOCIATED METHOD OF USE

CROSS-REFERENCE TO RELATED PATENT APPLICATIONS

This application is a U.S. National Phase Application under 35 U.S.C. § 371 of International Patent Application No. PCT/CN2018/089512, filed Jun. 1, 2018 and claims the benefit of priority under 35 U.S.C. Section 119(e) of U.S. Application Ser. No. 62/513,631, filed Jun. 1, 2017; which are incorporated herein by reference in their entireties. The International Application was published in English on Dec. 6, 2018 as International Publication No. WO 2018/219344 A1.

FIELD OF THE INVENTION

The present invention relates generally to nanostructured devices and, more particularly, to the fabrication and use of optical devices with gradient nanostructures for sensing biological and environmental parameters.

BACKGROUND OF THE INVENTION

Devices with nanostructures are widely used in biomedical sensing and environmental monitoring. The nanostructures are well designed and carefully fabricated to enhance the signal intensity. For fabrication reasons, wafer-based sensors consist of random structures with long-range uniformity, such as nanoparticle-based sensors, or uniform nanostructures, such as a hole array, a disk array and multi-layered structures.

Conventionally, sensing methods applied on these sensors are typically based on reflection or transmission spectrum analysis, which are expensive and time consuming Another type of sensing method is based on colorimetry. However, these colorimetric sensors cannot provide highly accurate results because they are limited by the color distinguishing ability of human eyes.

SUMMARY OF THE INVENTION

The present invention is directed to a new plasmonic sensor containing nano-size gradient structures with spatially varying geometric parameters.

The device contains a substrate and, at the center of the device, there is a plurality of nano-pillars extending from a surface of the substrate. The nano-pillars have metallic discs on top of them. A metallic back plane covers the substrate surface near the foot of nano-pillars. At the edge of the device there is a plurality of holes extending into the substrate from the top surface, and metallic discs are located at the bottoms of the holes. A nano-hole metallic plate covers the substrate surface in the region of the holes. From the center to the edge the sizes of nano-pillars gradually increase, then the shape transitions to holes, and the sizes of the holes gradually decrease from the central region to the edge.

The gradient of shapes induces different spectral responses at different regions of the sensor, which display different colors. When environment properties, such as refractive index, gas concentration or ion density, change the sensor will display different images.

A machine learning model has been developed to recognize the image patterns displayed by the sensor through an image recognition method, and with sufficient training data, the model can be used to extract the environment property with high accuracy based on the sensor image.

The fabrication method of the present invention is based on interference lithography and nanoimprint, which is more time-effective and cost-efficient than arbitrary lithography techniques like e-beam lithography or ion milling.

The present invention operates for a wide range of environmental characteristics because the sensing area contains spatially varying structures, so a broader range of environmental properties can be sensed more effectively at specific structures.

BRIEF DESCRIPTION OF THE DRAWINGS

The foregoing and other objects and advantages of the present invention will become more apparent when considered in connection with the following detailed description and appended drawings in which like designations denote like elements in the various views, and wherein.

DETAILED DESCRIPTION OF THE INVENTION

The present invention relates to a plasmonic sensor with gradient nanostructures, a method of use of the sensor and a method of fabricating the sensor. The gradient of shapes induce different spectral responses at different regions of the sensor and display different colors in response to the sensing of biological and environmental properties, such as refractive index, gas concentration or ion density changes. An image recognition based method can be used to extract or determine the property with high accuracy based on the image displayed by the sensor.

Figure 1:
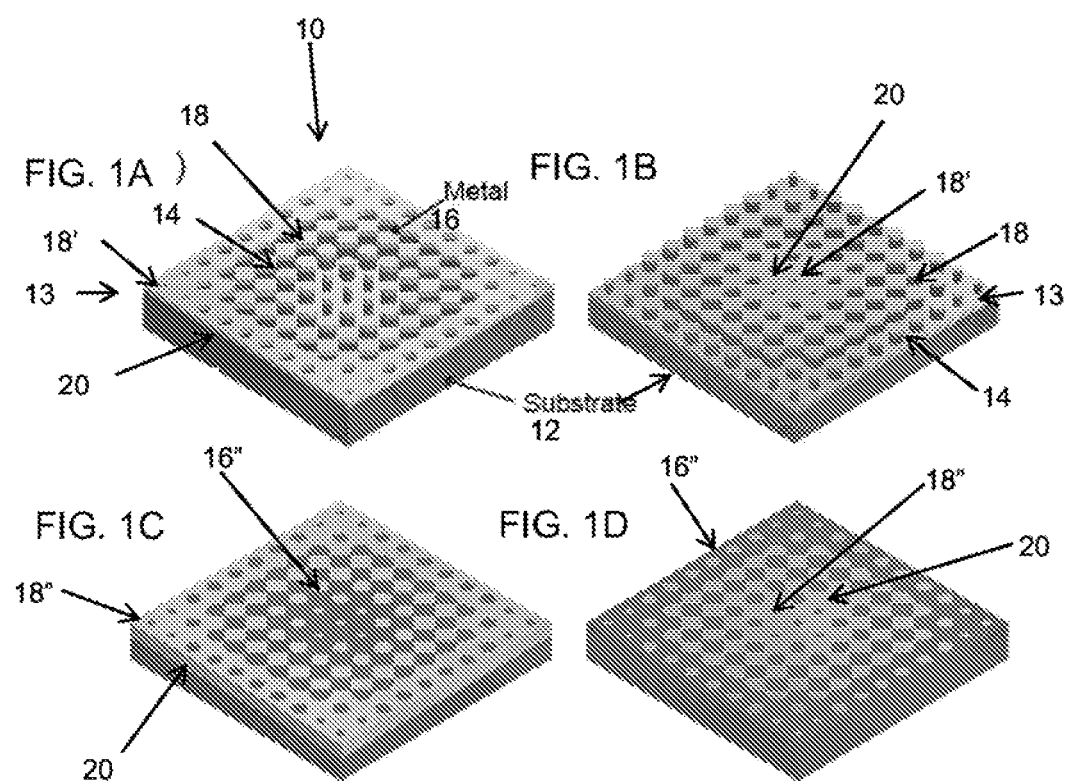
FIG. 1A shows a structure of the sensor according to the present invention with a disk-hole bilayer configuration.
FIG. 1B shows a hole-disk bilayer configuration.
FIG. 1C shows a disk-hole single-layer configuration.
FIG. 1D shows a hole-disk single-layer configuration.

According to an embodiment of the present invention (as shown in FIG. 1A), a gradient-pattern sensor 10 includes a transparent substrate 12. The substrate may, for example, be a plastic film. At the center of the sensor device 10 there is a plurality of nano-pillars 14 extending from a surface 13 of the substrate. Metallic discs 16 are located on top of the nano-pillars 14, while a metallic backplane 18 covers the substrate surface 13 near the foot of nano-pillars 14. At the edge of the sensor device there is a plurality of nano-holes 20 extending into the substrate 12 from the top surface 13, and metallic discs 16' are located at the bottom of the holes. A nano-hole metallic plate 18' covers the substrate surface 13 in the region of the holes. From the center to the edge, the sizes of nano-pillars 14 gradually increase. Then the shape transitions to nano-holes and the sizes of the nano-holes gradually decrease from the central region to the edge. In one embodiment, the center region of the substrate only comprises the nano-pillars structure but not the holes structure; and the edge region of the substrate only comprises the holes structure but not the nano-pillars structure. In one embodiment, the percentage of the area occupied by the nano-pillars is ranged from 20% to 80% of the total upper surface measured from the center of substrate.

The shape of the nano pillars and holes can be circular, rounded-cornered squares and square. The substrate can be a plastic film or a plastic layer on a rigid substrate. The arrangement of nano-holes and nano-pillars form a gradient nanostructure array. The nanostructure array may have a uniform repeating pattern with a period in the range from 100 nm to 5000 nm. The nano-pillars and nano-holes of the gradient nanostructure array may have lateral dimensions in the range from 10 nm to 1000 nm and heights in the range from 5 nm to 500 nm.

The metallic discs have the same lateral dimensions as the nano-pillars and nano-holes on top of or at the bottom which they are located. Further the nano-pillars and backplane can be made from one of gold, silver, copper, platinum, and palladium, or a combination thereof. Further, the metallic disks and backplane can have a thickness in the range from 5 nm to 100 nm.

The gradient pattern plasmonic sensor according to the invention has a high sensitivity because it makes use of the spectral transmission information collected at a series of nanostructures rather than only one nanostructure. It has low implementation costs because it maps the spectral information to spatial positions and therefore enables the use of cost-effective image sensor for spectral detection.

According to another embodiment of the present invention (as shown in FIG. 1B), a gradient-pattern sensor includes transparent substrate 12, and at the center of the device, a plurality of nano-holes 20 extend into the substrate from the top surface 13. Metallic discs 16' are at the bottom of the nano-holes 20, while a nano-hole metallic plate 18' covers the substrate surface in the region of the nano-holes 20. At the edge of the device, a plurality of nano-pillars 14 extending from the surface 13 of the substrate, and metallic discs 16 are located on top of the nano-pillars 14. A metallic backplane 18 covers the substrate surface near the foot of nano-pillars 14. From the center to the edge, the sizes of the nano-holes 20 gradually increase, then the shape transitions to nano-pillars 14, and the sizes of the nano-holes 20 gradually decrease from the central region to the edge. In one embodiment, the center region of the substrate only comprises the nano-holes structure but not the nano-pillars structure; and the edge of the substrate only comprises the nano-pillars structure but not the nano-holes structure. In one embodiment, the percentage of the area occupied by the nano-holes is ranged from 20% to 80% of the total upper surface measured from the center of substrate.

In addition to the dual layer configurations in FIGS. 1A and 1B, the present invention includes single-layer configurations wherein the shape of a unit cell is a metallic disk or metallic plane with a nano-hole embedded in the substrate. The shape of the disk and the nano-hole can be circular, rounded corner square and square. According to another embodiment of the present invention (as shown in FIG. 1C), a gradient-pattern sensor includes a transparent substrate 12, and at the center of the device, there is a plurality of metallic disks 16'' embedded in the substrate. At the edge of the device, a metallic plane 18'' with nano-holes 20 is embedded in the substrate. From the center to the edge, the sizes of the disks gradually increase, then the shape transitions to nano-holes 20, and the sizes of the nano-holes 20 gradually decrease from the central region to the edge. In one embodiment, the center region of the substrate only comprises the disks structure but not nano-holes structure and the edge region of the substrate only comprises the nano-holes structure but not the disks structure. In one embodiment, the percentage of the area occupied by the disks is ranged from 20% to 80% of the total upper surface measured from the center of substrate.

According to a still further embodiment of the present invention (as shown in FIG. 1D), a gradient-pattern sensor 10 includes a transparent substrate 12, and at the center of the device there is a metallic plane 18'' with nano-holes 20 in the substrate. At the edge of the device, there is a plurality of metallic disks 16'' embedded in the substrate. From the center to the edge, the sizes of nano-holes 20 gradually increase, then the shape transitions to disks, and the sizes of the disks gradually decrease from the central region to the edge. In one embodiment, the center region of the substrate only comprises the nano-holes structure but not the disks structure and the edge region of the substrate only comprises the disks structure but not the nano-holes structure. In one embodiment, the percentage of the area occupied by the nano-holes is ranged from 20% to 80% of the total upper surface measured from the center of substrate.

Figure 2:
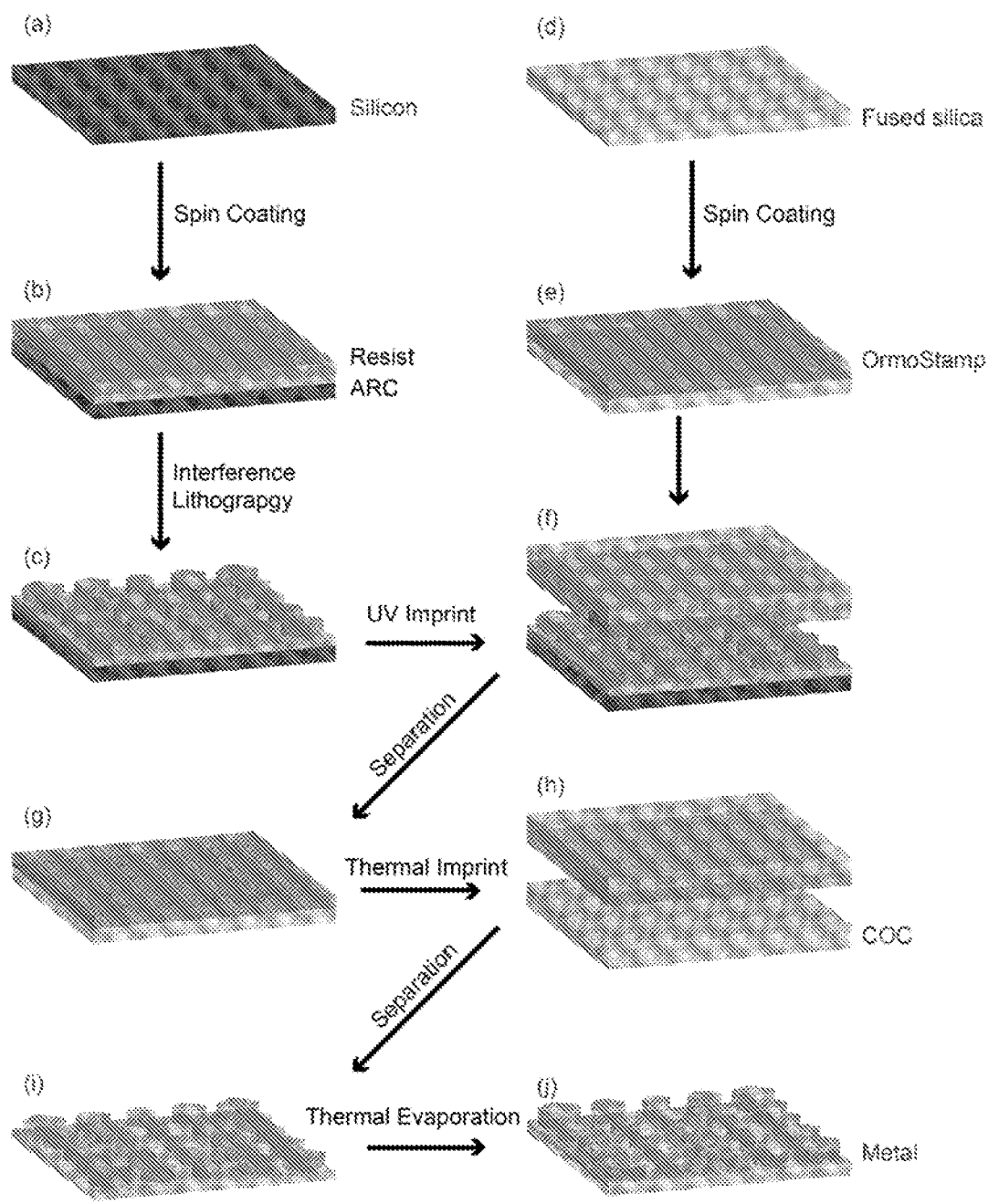
FIG. 2 shows a fabrication procedure for the sensor according to the present invention wherein steps (a-c) show gradient pattern fabrication by interference lithography, steps (d-g) show fabrication of a nanoimprint lithography template with a gradient pattern, steps (h-i) show fabrication of thin films by nanoimprint, and step (j) shows metal deposition.

A gradient-pattern plasmonic sensor according to an embodiment of the present invention can be fabricated in a cost-effective manner that includes steps of lithography, pattern transfer, thermal imprinting and metal deposition. A schematic of an approach for fabricating a gradient-pattern plasmonic sensor according to an embodiment of the present invention can be seen in FIG. 2. According to FIG. 2, a method for fabricating a sensor with pillar-hole structures covered by gold disks and nano-hole planes according to an embodiment of the present invention includes five steps: (i) gradient pattern formation in a spin-coated polymer resist on a silicon wafer by interference lithography as shown at (a)-(c) in FIG. 2; (ii) gradient pattern transfer from the silicon wafer to a UV-curable resist (e.g., OrmoStamp) on fused silica wafer by a UV imprinting process as shown at (d)-(f) in FIG. 2; (iii) gradient pattern transfer from the fused silica wafer to a polymer film, e.g., cyclic olefin copolymer (COC) film, by a thermal imprinting process as shown at (g)-(h) in FIG. 2; and (iv) deposition of gold by thermal evaporation to the polymer film to form disks and a nano-hole plane as shown at (i)-(j) in FIG. 2.

As an alternative, the plasmonic sensor can be fabricated by preparing a first substrate, for example a silicon film. Then a layer of dissolvable resist is placed on the first substrate. A gradient grid pattern created in the resist layer by a lithography method exposing part of the first substrate. Next the first substrate is placed in an electroplating bath and electrodeposition of a metal into the grid pattern is carried out. The electrodeposition is stopped when the metal reaches a sufficient thickness or is over plated out of a trench of the bath. Next the resist layer is dissolved and the first substrate is covered with a second substrate having a deformable surface layer. The gradient nanostructures are pressed into the second substrate. Finally the second substrate is solidified.

Nanostructures with different geometric parameters induce different optical responses and show different colors. The color will change with changes in the environmental properties sensed. Therefore, the image of the sensor will provide information about the ambient properties, such as the refractive index or concentration of certain analytes (substances under analysis). The sensing result analysis is conducted by an image-recognition based algorithm that compares the captured sensor image with the images captured under different environmental conditions and provides information about one or more characteristics of the environment or objects within the environment.

A greater understanding of the present invention and of its many advantages may be had from the following examples, given by way of illustration. The following examples are illustrative of some of the applications and embodiments of the present invention. They are, of course, not to be considered as limiting the invention. Numerous changes and modifications can be made with respect to the invention.

Example 1

Figure 3A:
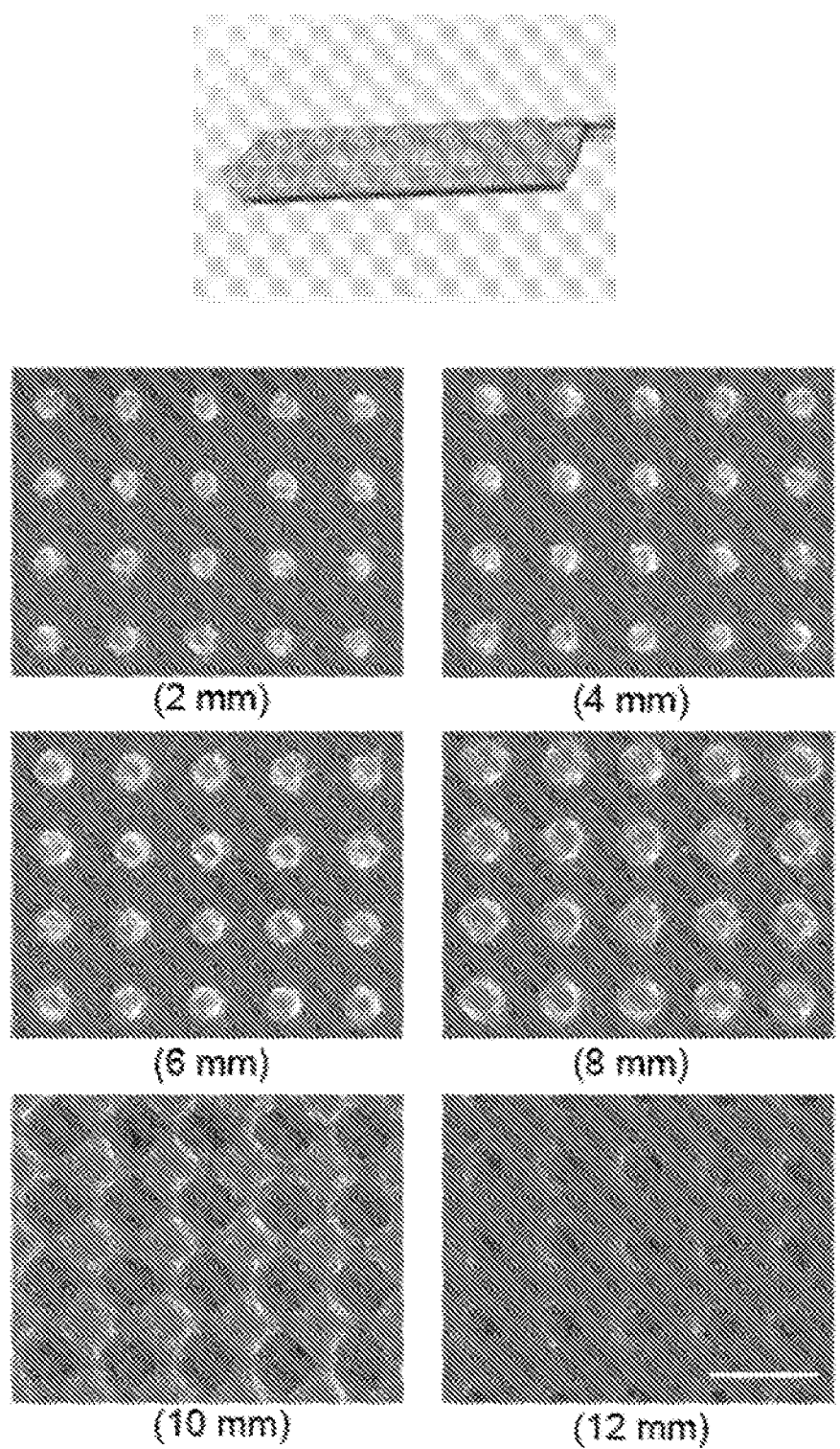
FIG. 3A shows a silicon substrate with a nanostructured resist layer and SEM images of the nanostructures at different regions of the sample.
Figure 3B:
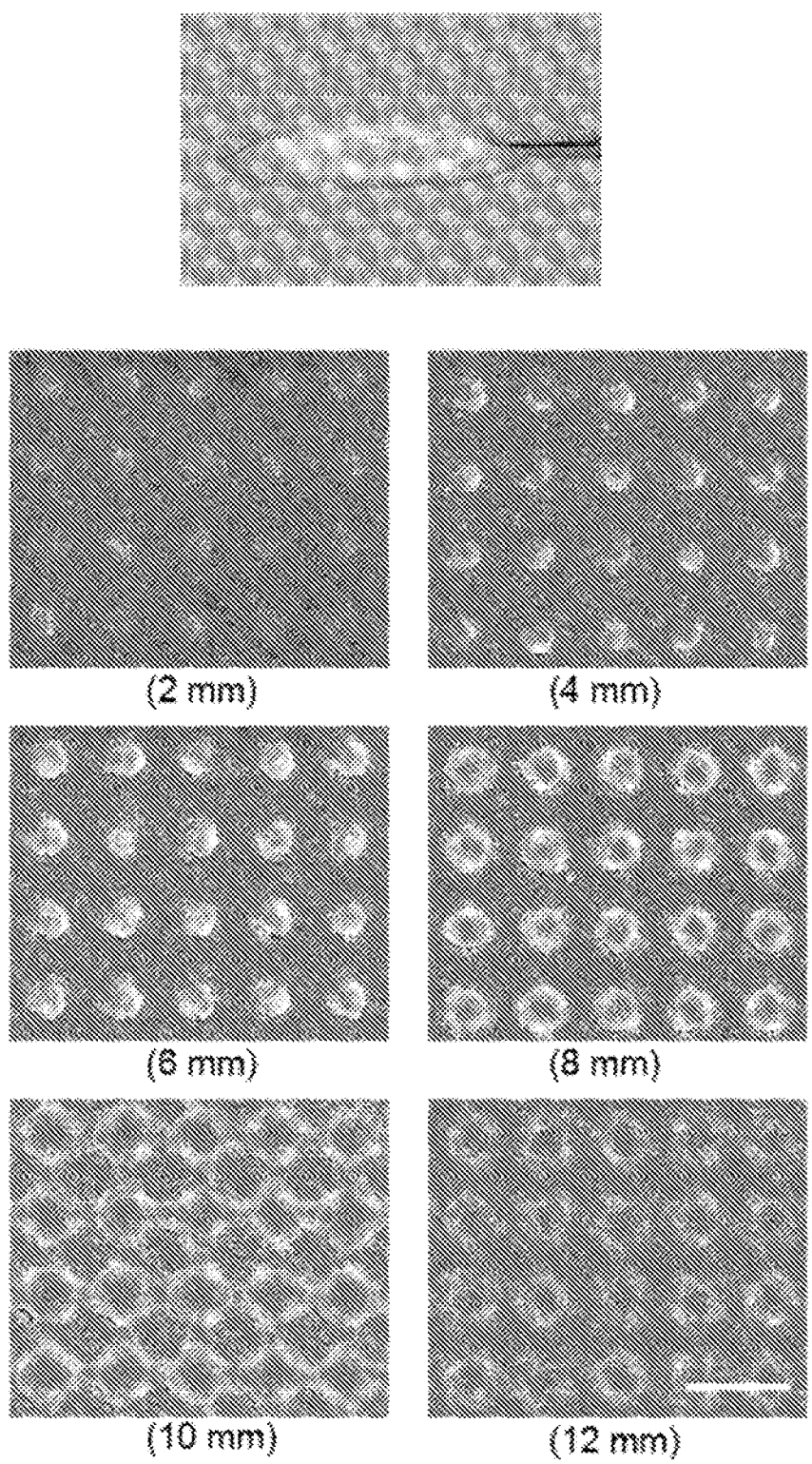
FIG. 3B shows a final sensor with a nanostructured surface covered by gold disks and a nano-hole plane, and SEM images of the nanostructures at different region of the sample.

An embodiment of the present invention was fabricated as seen in FIGS. 3A-B, In the sensor embodiment of FIGS. 3A-B, a sensor with pillar-hole structures covered by gold disks and nano-hole plane was fabricated using the above stated fabrication procedure with interference lithography being used to pattern the resist.

FIG. 3A shows the gradient color rings displayed by gradient nanostructures on a silicon substrate. SEM characterizations show the nano pillars and holes at different radial distances in the resist. The nanostructures have a period of 370 nm. Then the gradient pattern was transferred to a fused silica wafer by UV imprint lithography to create a thermal imprint template. Then, a thermoplastic film such as a cyclic olefin copolymer ("COC") film was placed on the fused silica template with a gradient pattern, heated, pressed and separated. Finally, an 80 nm gold layer was deposited on the COC film by thermal evaporation. As a result, a sensor with pillar-hole structures covered by gold disks and a nano-hole plane is fabricated. The SEM images in FIG. 3A show patterns on the silicon substrate with radial distances of 2 mm, 4 mm, 6 mm, 8 mm, 10 mm and 12 mm as indicated.

FIG. 3B shows the final sensor and SEM images of the nano pillars and holes at different position of the sensor. The sensor has a diameter of about 3 cm. In place of copper, other materials such as silver, palladium can be used. With this design, the sensor parameters, such as the nanostructure period, height, metal thickness, can be modified for other sensing purposes.

Example 2

A gradient-pattern plasmonic sensor according to an embodiment of the present invention can be used in a spectrometer-free way. A schematic of an approach for using the gradient-pattern plasmonic sensor according to an embodiment of the present invention can be seen in FIG. 4. The setup used for liquid refractive index measurement using a sensor 10 with pillar-hole structures covered by gold disks and nano-hole planes according to an embodiment of the present invention includes: (i) a white illumination light source 40, illuminating the sensor 10 from the back side; (ii) the sensor is covered with refractive index liquid 42; and (iii) a camera 44 taking pictures from the front side. The camera may be a cellphone camera or a CMOS or a CCD camera. The liquid 42 can be any one of a number of functional materials, e.g., palladium, hydrogel, an antibody, protein, gas molecules, ions in water, antigen and DNA.

In one arrangement an iPhone was used with a white background screen because it has a uniform intensity screen and a wide wavelength range. The sample was placed approximately 10 cm above the cellphone screen with a drop of index liquid on it. A thin cover glass was used to ensure that the index liquid had a flat surface. The image capturing equipment was a Canon EOS 650D camera with a macro lens. The focus length and aperture of the lens were 25 mm and F/2.8, respectively. The exposure time and ISO were set to 1 second and 100, respectively to enhance the signal-to-noise ratio.

Figure 4:
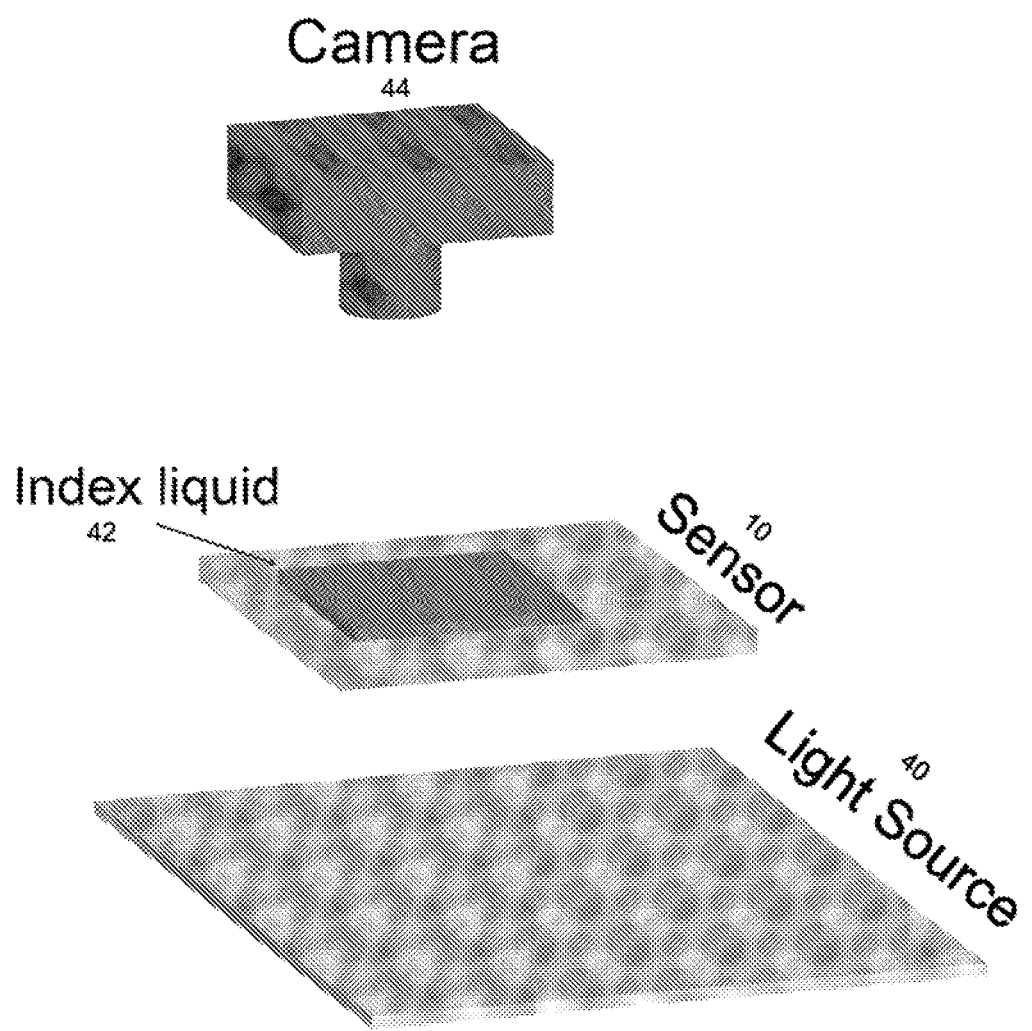
FIG. 4 shows a setup for capturing images of the sensor covered by liquids having different ambient indices.
Figure 5A:
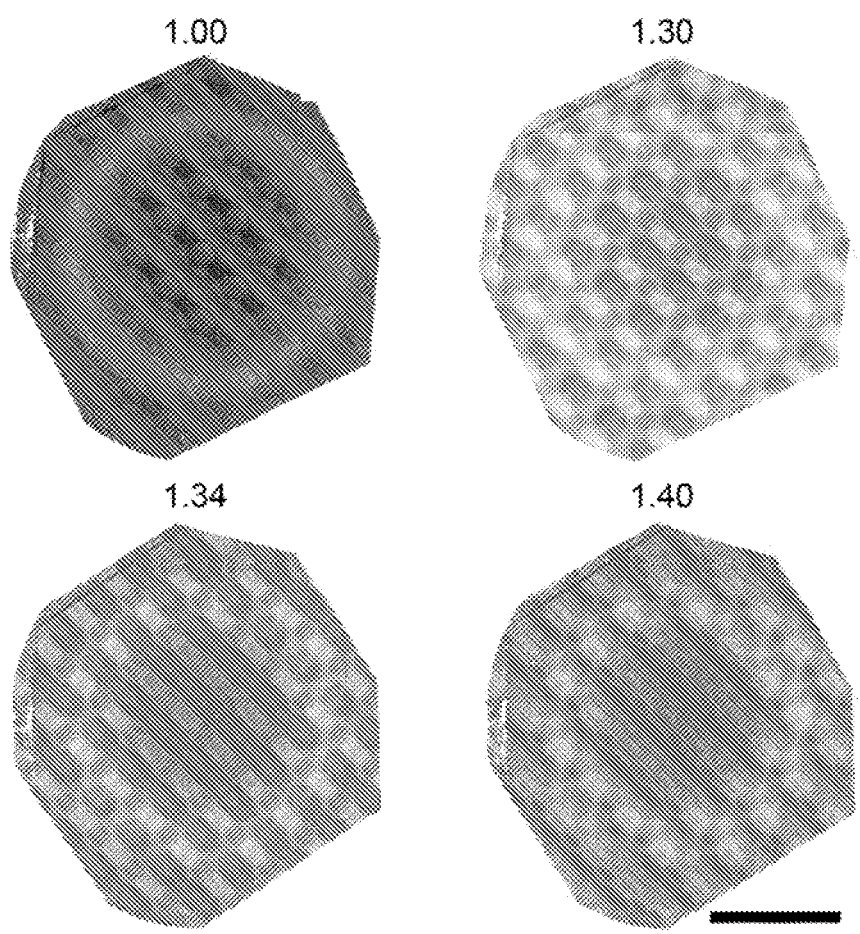
FIG. 5A shows pictures of the sensor covered by material with different refractive indices.

The images of the sensor in air and covered by different substances with refractive indexes in the range from 1.30 to 1.40 are taken by the camera 44. The measurement is performed using the setup as shown in FIG. 4. FIG. 5A shows four image of the sensor in air (1.00) and covered by liquids with refractive indexes of 1.30, 1.34 and 1.40.

Figure 5B:
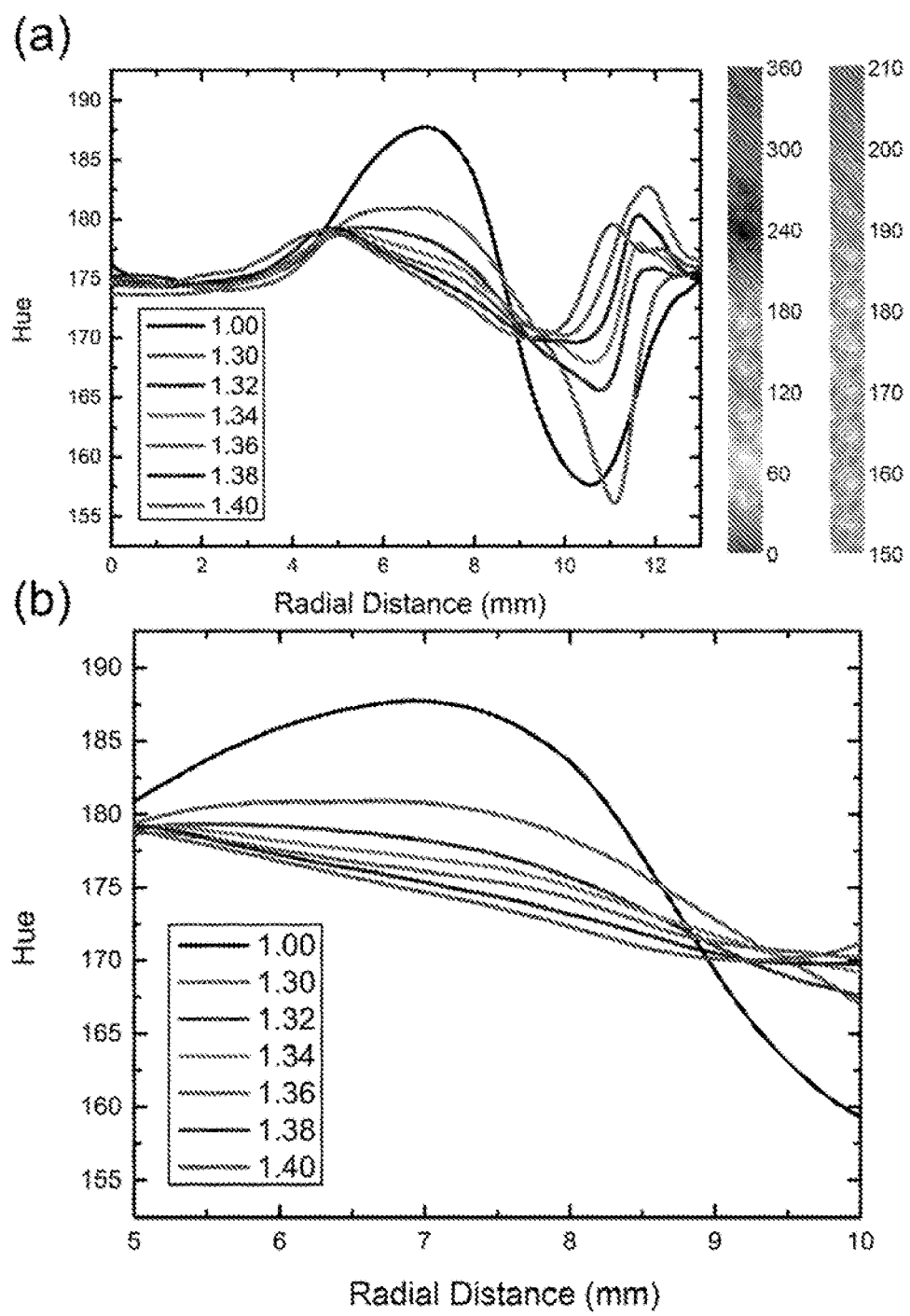
FIG. 5B shows graphs of (a) the hue intensity versus radial distance of sensors covered by materials of refractive indices in a range from 1.00 to 1.40 over a radial distance of 0 to 12 mm and an enlarged graph (b) over a radial distance of 5-10 mm.

An image-recognition-based algorithm is then used to process these images to increase the sensitivity of the sensor. The algorithm can transfer the image into redial intensity distributions or radial color distributions. The pixel values of three channels (red, green and blue) are averaged across a circle with the same radial distance to the sample center. Then the RGB signal is transferred to the HSV (hue, saturation, and value (or brightness)) signal. The hue versus radial distance curses were plotted in FIG. 5B. Different hue distributions indicated different refractive indexes. Flatter hue distribution indicates higher index. A neural network or machine learning device can be used to recognize the image patterns on the sensor through image recognition so as to extract the environmental property that the image represents with high accuracy.

While the present invention has been particularly shown and described with reference to preferred embodiments thereof; it will be understood by those skilled in the art that various changes in form and details may be made therein without departing from the spirit and scope of the invention, and that the embodiments are merely illustrative of the invention, which is limited only by the appended claims. In particular, the foregoing detailed description illustrates the invention by way of example and not by way of limitation. The description enables one skilled in the art to make and use the present invention, and describes several embodiments, adaptations, variations, and method of uses of the present invention.

What is claimed is:

1. A sensor comprising: a transparent substrate; a plurality of nano-pillars extending from a surface of the substrate at a center part thereof, feet of said pillars contacting the surface of the substrate; metallic discs located on tops of the nano-pillars; a metallic backplane covering the substrate surface near the feet of the nano-pillars; nano-holes penetrating the surface of the substrate, said nano-holes located at least at an edge of the substrate; metallic discs located at the bottoms of the nano-holes; and a nano-hole metallic plate covering the substrate surface in the region of the nano-holes, wherein from the center to the edge of the substrate the sizes of the nano-pillars gradually increase, then the nano-pillars transition to nano-holes, and the sizes of the nano-holes gradually decrease from the central region to the edge.

2. A sensor comprising: a transparent substrate; a plurality of nano-holes penetrating a surface of the substrate at a center part thereof; metallic discs located at the bottoms of the nano-holes; a metallic nano-hole plate covering the substrate surface in the region of the nano-holes; a plurality of nano-pillars extending from the surface of the substrate, said nano-pillars located at least at an edge of the substrate; metallic discs located on tops of the nano-pillars; and a metallic backplane covering the substrate surface near the feet of the nano-pillars, wherein from the center to the edge of the substrate the sizes of the nano-holes gradually increase, then the nano-holes transition to nano-pillars, and the sizes of the nano-pillars gradually decrease from the central region to the edge.

3. A sensor comprising: a transparent substrate; a plurality of metallic disks embedded in the substrate at the center thereof; a plurality of nano-holes penetrating a surface of the substrate at an edge thereof; and a metallic plane covering the surface of the substrate in the region of the nano-holes, wherein from the center to the edge of the substrate the sizes of the disks gradually increase, then the disks transitions to nano-holes, and the sizes of the nano-holes gradually decrease from the central region to the edge.

4. A sensor comprising: a transparent substrate; a plurality of nano-holes penetrating a surface of the substrate at the center of the substrate; a metallic plane covering the surface of the substrate in the region of the nano-holes; and a plurality of metallic disks embedded in the substrate at an edge thereof; wherein from the center to the edge the sizes of nano-holes gradually increase, then the nano-holes transition to disks, and the sizes of the disks gradually decrease from the central region to the edge.

5. A sensor comprising; a substrate; an array of nanostructures arranged so that said nanostructures have at least one geometric dimension continuously varying with the spatial position and forming a gradient pattern, wherein said nanostructures comprise: nano-holes located toward one of the edges of the substrate and the center of the substrate, nano-pillars located toward the other of the center of the substrate and the edges of the substrate, metallic disks located at the bottoms of the nano-holes and the tops of the nano-pillars, and wherein from the center to the edge of the substrate the sizes of the nano-holes or nano-pillars gradually increase, then the nano-holes or nano-pillars transition to the other of the nano-pillars or nano-holes whose sizes gradually decrease from the central region to the edge.

6. The sensor according to claim 5 further including; a metallic backplane covering the substrate surface near the pillars and a metallic plate covering the surface of the substrate in the region of the nano-holes.

7. The sensor according to claim 6 wherein the metallic disks and backplane are made of one of gold, silver, copper, platinum, and palladium or a combination thereof.

8. The sensor according to claim 6 wherein the metallic disks and backplane have thickness in the range from 5 nm to 100 nm.

9. A method for detecting of a property of a substance comprising: placing the substance in contact with a gradient-pattern plasmonic sensor according to claim 6; illuminating the sensor with light; using a camera to take images of the sensor; and analyzing the images with an image-recognition algorithm.

10. The method of claim 9 wherein the said property includes refractive index.

11. The method of claim 9 wherein the illuminating light has a single wavelength in the range from 400 nm to 750 nm.

12. The method of claim 9 wherein the camera is a cellphone camera or a CMOS or a CCD camera.

13. The method of claim 9 wherein the image-recognition algorithm transfers the image into radial intensity distribution.

14. The method of claim 9 wherein the image-recognition algorithm transfers the image into radial color distribution.

15. The method of claim 9 wherein the substance is a layer of functional material selected from the group of palladium, hydrogel, an antibody, protein, gas molecules, ions in water, antigen and DNA.

16. The sensor according to claim 5 wherein the substrate is a plastic film.

17. The sensor according to claim 5 wherein said array of nanostructures has a period in the range from 100 nm to 5000 nm.

18. The sensor according to claim 5 wherein said array of nanostructures is arranged so that said array has gradient geometric parameters.

19. The sensor according to claim 5 wherein the nano-pillars and nano-holes have a lateral dimension in the range from 10 nm to 1000 nm and/or a height in the range from 5 nm to 500 nm.

20. The sensor according to claim 5 wherein the metal disks located on top of the pillars have the same lateral dimension as the pillars.

21. A method for making a gradient-pattern plasmonic sensor, comprising the steps of: preparing a first substrate; preparing a layer of dissolvable resist on the first substrate; creating a gradient grid pattern of pillar and hole structures in the resist layer by a lithography method; covering the first substrate with a second substrate having a UV-curable layer and then solidifying the second substrate; covering the second substrate with a third substrate having a deformable surface layer so as to form pillar and hole gradient nanostructures; pressing the gradient nanostructures on the second substrate into the third substrate and then solidifying the third substrate; and evaporating metal on the third substrate.

22. The method according to claim 21 wherein the first substrate is a silicon film, the step of preparing a layer of dissolvable resist on the first substrate is carried out by spin coating, the step of creating a gradient grid pattern in the resist layer is carried out by interference lithography, the second substrate is fused silica and the third substrate is a cyclic olefin copolymer film.

23. A method for making a gradient-pattern plasmonic sensor, comprising the steps of: preparing a first substrate; preparing a layer of dissolvable resist on the first substrate; creating the gradient grid pattern in the resist layer by a lithography method exposing part of the first substrate so as to form pillar and hole gradient nanostructures; placing the first substrate in an electroplating bath and conducting electrodeposition of a metal into the grid pattern; ceasing electrodeposition when the metal reaches a sufficient thickness or is over plated out of a trench of the bath; dissolving the resist layer; covering the first substrate with a second substrate having a deformable surface layer so as to form pillar and hole gradient nanostructures; and pressing the gradient nanostructures on the second substrate into the second substrate and then solidifying the second substrate.

* * * * *